(12) United States Patent
Uchida et al.

(10) Patent No.: US 8,275,852 B2
(45) Date of Patent: *Sep. 25, 2012

(54) SYSTEM, COMPUTER PROGRAM PRODUCT AND METHOD FOR MANAGING DOCUMENTS

(75) Inventors: Yuki Uchida, Wayne, NJ (US); Shogo Hyakutake, Boonton Township, NJ (US); Minoru Aoshima, Edgewater, NJ (US)

(73) Assignees: Ricoh Americas Corporation, West Caldwell, NJ (US); Ricoh Company, Ltd., Tokyo (JP)

( * ) Notice: Subject to any disclaimer, the term of this patent is extended or adjusted under 35 U.S.C. 154(b) by 950 days.

This patent is subject to a terminal disclaimer.

(21) Appl. No.: 11/545,492

(22) Filed: Oct. 11, 2006

(65) Prior Publication Data

US 2007/0094358 A1      Apr. 26, 2007

Related U.S. Application Data

(62) Division of application No. 09/684,965, filed on Oct. 10, 2000, now Pat. No. 7,401,125.

(51) Int. Cl.
*G06F 15/16* (2006.01)

(52) U.S. Cl. ......... 709/217; 709/201; 709/202; 709/219

(58) Field of Classification Search .......... 709/201–202, 709/217, 219
See application file for complete search history.

(56) References Cited

U.S. PATENT DOCUMENTS

| | | |
|---|---|---|
| 4,992,940 A | 2/1991 | Dworkin |
| 5,341,477 A | 8/1994 | Pitkin et al. |
| 5,758,328 A | 5/1998 | Giovannoli |
| 5,818,447 A | 10/1998 | Wolf et al. |
| 5,835,905 A | 11/1998 | Pirolli et al. |
| 5,835,908 A | 11/1998 | Bennett et al. |
| 5,873,080 A | 2/1999 | Coden et al. |
| 5,874,954 A | 2/1999 | Kilmer et al. |
| 5,887,171 A | 3/1999 | Tada et al. |
| 5,892,909 A | 4/1999 | Grasso et al. |
| 5,893,109 A | 4/1999 | DeRose et al. |
| 5,895,470 A | 4/1999 | Pirolli et al. |

(Continued)

FOREIGN PATENT DOCUMENTS

EP      0 860 786      8/1998

(Continued)

OTHER PUBLICATIONS

Technical Note WebEntree: A Web service Aggregator by Y. Zhao IBM Systems Journal, vol. 37, No. 4, 1998 pp. 584-595.

(Continued)

*Primary Examiner* — George C Neurauter
(74) *Attorney, Agent, or Firm* — Oblon, Spivak, McClelland, Maier & Neustadt, L.L.P.

(57) ABSTRACT

A system, method and computer program product for managing documents. The system includes a document manager that is configured to search for application services providers (ASPs) over a network and based on a user input. The document manager can search documents within the ASPs, retrieve documents and URLs, store documents and data, format documents, generate and issue unified bills from a plurality of bills from a plurality of ASPs. The documents manager can provide consulting advise to the user regarding document managing, and can manage the documents stored on a user storage device, for example by transferring these documents to a ASP storage device after storage time periods associated with the documents.

45 Claims, 13 Drawing Sheets

U.S. PATENT DOCUMENTS

| | | | |
|---|---|---|---|
| 5,913,033 A | 6/1999 | Grout | |
| 5,913,215 A | 6/1999 | Rubinstein et al. | |
| 5,915,019 A | 6/1999 | Ginter et al. | |
| 5,917,912 A | 6/1999 | Ginter et al. | |
| 5,924,096 A | 7/1999 | Draper et al. | |
| 5,940,843 A * | 8/1999 | Zucknovich et al. | 715/210 |
| 5,949,876 A | 9/1999 | Ginter et al. | |
| 5,963,969 A | 10/1999 | Tidwell | |
| 5,974,234 A | 10/1999 | Levine et al. | |
| 5,982,891 A | 11/1999 | Ginter et al. | |
| 5,991,877 A * | 11/1999 | Luckenbaugh | 726/1 |
| 6,006,234 A * | 12/1999 | Govindarajan et al. | 1/1 |
| 6,006,251 A | 12/1999 | Toyouchi et al. | |
| 6,006,264 A | 12/1999 | Colby et al. | |
| 6,009,442 A | 12/1999 | Chen et al. | |
| 6,011,905 A | 1/2000 | Huttenlocher et al. | |
| 6,014,662 A | 1/2000 | Moran et al. | |
| 6,020,973 A | 2/2000 | Levine et al. | |
| 6,038,561 A | 3/2000 | Snyder et al. | |
| 6,038,574 A | 3/2000 | Pitkow et al. | |
| 6,055,544 A | 4/2000 | DeRose et al. | |
| 6,065,026 A | 5/2000 | Cornelia et al. | |
| 6,078,326 A | 6/2000 | Kilmer et al. | |
| 6,088,732 A | 7/2000 | Smith et al. | |
| 6,094,649 A | 7/2000 | Bowen et al. | |
| 6,112,239 A | 8/2000 | Kenner et al. | |
| 6,112,279 A | 8/2000 | Wang | |
| 6,141,759 A | 10/2000 | Braddy | |
| 6,163,602 A | 12/2000 | Hammond et al. | |
| 6,236,987 B1 | 5/2001 | Horowitz et al. | |
| 6,253,239 B1 * | 6/2001 | Shklar et al. | 709/217 |
| 6,256,633 B1 | 7/2001 | Dharap | |
| 6,262,732 B1 | 7/2001 | Coleman et al. | |
| 6,286,045 B1 | 9/2001 | Griffiths et al. | |
| 6,292,802 B1 | 9/2001 | Kessenich et al. | |
| 6,321,228 B1 | 11/2001 | Crandall et al. | |
| 6,343,323 B1 | 1/2002 | Kalpio et al. | |
| 6,377,939 B1 | 4/2002 | Young | |
| 6,377,944 B1 * | 4/2002 | Busey et al. | 1/1 |
| 6,385,655 B1 * | 5/2002 | Smith et al. | 709/232 |
| 6,415,285 B1 | 7/2002 | Kitajima et al. | |
| 6,430,558 B1 * | 8/2002 | Delano | 707/5 |
| 6,480,304 B1 | 11/2002 | Os et al. | |
| 6,496,206 B1 | 12/2002 | Mernyk et al. | |
| 6,510,466 B1 | 1/2003 | Cox et al. | |
| 6,560,606 B1 | 5/2003 | Young | |
| 6,591,289 B1 * | 7/2003 | Britton | 709/203 |
| 6,615,233 B1 | 9/2003 | Davis et al. | |
| 6,658,452 B1 * | 12/2003 | Becker et al. | 709/201 |
| 6,681,223 B1 | 1/2004 | Sundaresan | |
| 6,717,938 B1 | 4/2004 | D'Angelo | |
| 6,745,178 B1 | 6/2004 | Emens et al. | |
| 6,766,320 B1 | 7/2004 | Wang et al. | |
| 6,820,237 B1 * | 11/2004 | Abu-Hakima et al. | 715/210 |
| 6,862,713 B1 | 3/2005 | Kraft et al. | |
| 7,194,533 B1 * | 3/2007 | DeLuca | 709/224 |
| 7,320,004 B1 * | 1/2008 | DeLuca et al. | 707/102 |
| 2010/0169304 A1 * | 7/2010 | Hendricksen et al. | 707/723 |

FOREIGN PATENT DOCUMENTS

| | | |
|---|---|---|
| EP | 1 050 830 | 11/2000 |
| EP | 1 158 423 | 11/2001 |
| JP | 8-255168 | 10/1996 |
| JP | 10-116293 | 5/1998 |
| JP | 11-015840 | 1/1999 |
| JP | 2000-137561 | 5/2000 |
| JP | 2001256189 A * | 9/2001 |
| WO | WO 93/24892 | 12/1993 |
| WO | WO 95/20793 | 8/1995 |
| WO | WO 95/24011 | 9/1995 |
| WO | WO 97/45800 | 12/1997 |
| WO | WO 99/12106 | 3/1999 |
| WO | WO 99/34304 | 7/1999 |
| WO | WO 00/39678 | 7/2000 |
| WO | WO 00/41087 | 7/2000 |
| WO | WO 01/93121 | 12/2001 |

OTHER PUBLICATIONS

Proceedings of eth 33$^{rd}$ Hawaii International Conference on System Sciences—2000 An Innovative Internet Architecture for Application Service Providers Borko Furht, et al. pp. 1-10.

U.S. Appl. No. 11/612,929, filed Dec. 19, 2006, Hyakutake, et al.

U.S. Appl. No. 11/612,943, filed Dec. 19, 2006, Hyakutake, et al.

U.S. Appl. No. 11/675,125, filed Feb. 15, 2007, Uchida, et al.

U.S. Appl. No. 11/675,774, filed Feb. 16, 2007, Hyakutake, et al.

U.S. Appl. No. 11/676,779, filed Feb. 16, 2007, Hyakutake, et al.

Masahiro Nakagawa, Monthly Computer Digest, TAC Kikaku Inc., Sep. 10, 2000, vol. 26, No. 9, p. 95 (with English excerpts).

Hiroshi Maruo, "ASP Portals collecting "marketable" software to improve selection", Nikkei Systems Provider, No. 110, Nikkei Business Publications, Inc., Sep. 15, 2000, pp. 69-71 (with English excerpts).

Masahiro Nakagawa, Monthly Computer Digest, TAC Kikaku Inc., Sep. 10, 2000, vol. 26, No. 9, pp. 111-112 (with English excerpts).

"Software Too to release backup software "Retrospect Express" in Feb. 1999", Nikkei MAC, vol. 70, Nikkei Business Publications, Inc., Jan. 18, 1999, vol. 7, No. 2, p. 18 (with English excerpts).

* cited by examiner

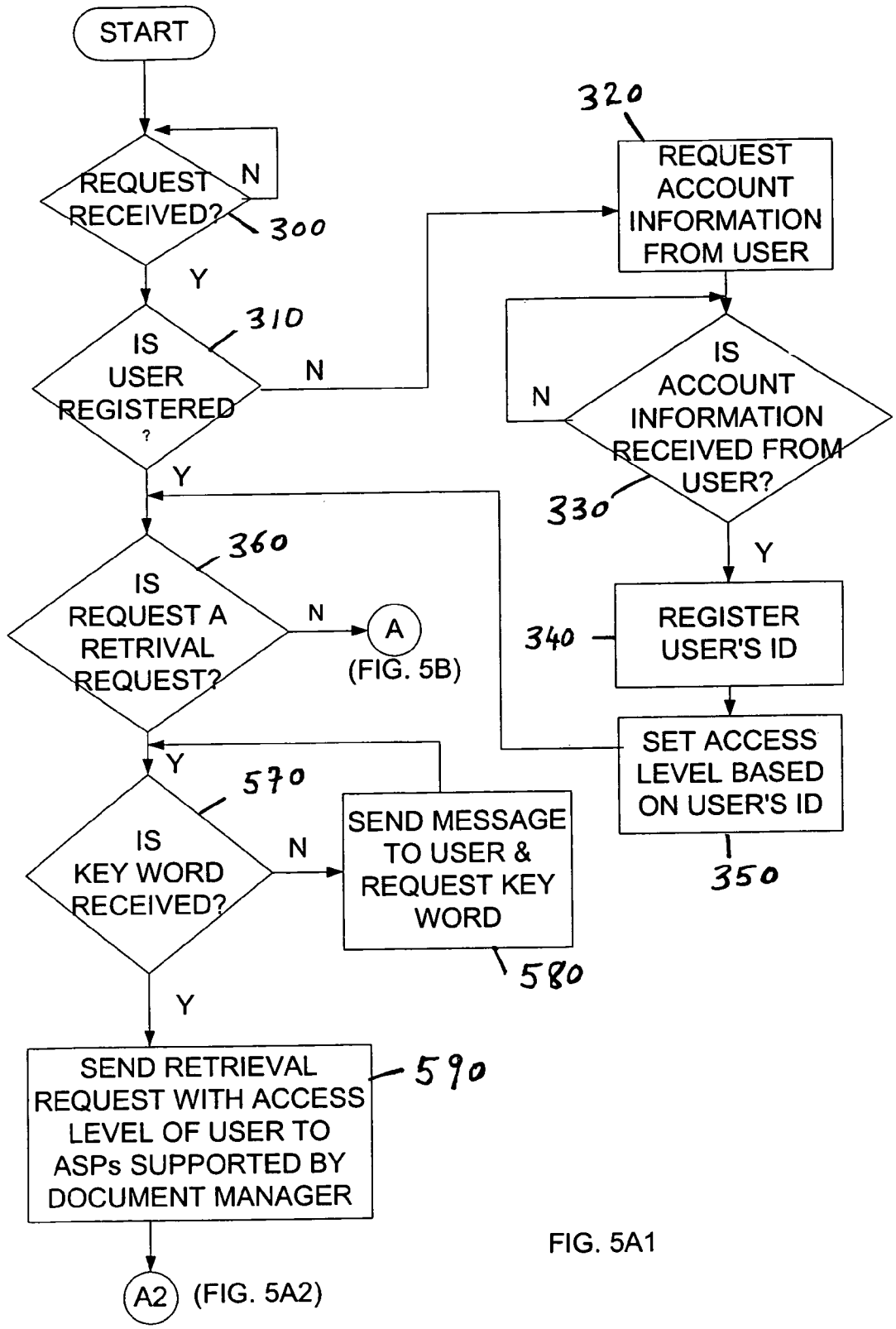
FIG. 5A1

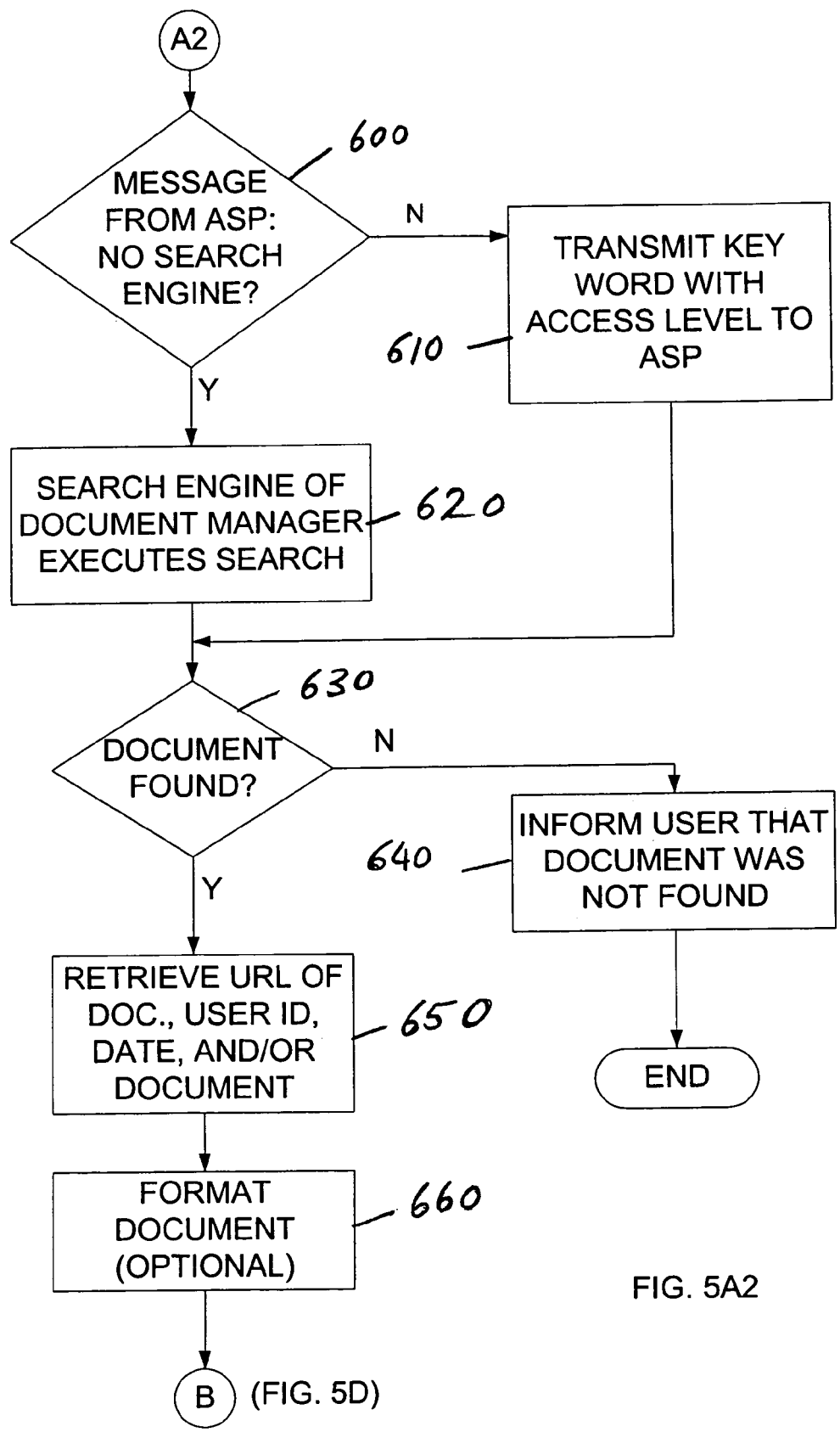
FIG. 5A2

SYSTEM, COMPUTER PROGRAM PRODUCT AND METHOD FOR MANAGING DOCUMENTS

BACKGROUND OF THE INVENTION

1. Field of the Invention

The present invention is directed to methods, computer-based systems and computer program products for managing documents, in particular document retrieved from, or stored to, application service providers.

2. Discussion of the Background

An application service provider (ASP) is an entity, typically a company, that offers users (individual customers, companies, enterprises, etc.) access over a network, such as the Internet, to applications and related services that would otherwise have to be located on the customer's local computer. For example, ASPs can provide searchable databases of legal, medical, financial, educational, scientific, or marketing documents. Alternatively, some companies provide in-house type ASPs wherein applications are not on the company's employee's personal computers, but instead on a company computer accessible by the employees via a company network. For the purpose of this document, the term "ASP" is thus intended to be broadly interpreted and to include a provider that allows a user to use an application not loaded on the user's computer.

An example of a conventional network of ASPs connected via the Internet is shown in FIG. 1, which shows four exemplary document ASPs 10-40 connected to the Internet 50. In this example, user 70 may independently connect to the ASPs 10-40 via the Internet 50 and download documents, either to view on the screen of the personal computer (PC) 80, to print with printer 90, to store in the local storage device 100 and/or medium drive 110.

Today, there are a great number of ASPs providing various kinds of services and documents. For example, an ASP may provide legal documents, while another may provide marketing documents, yet another may provide educational, scientific, financial, or medical documents, etc. Furthermore, different ASPs may provide these documents in different formats, for example, using different graphical user interfaces (GUIs). When a user needs different kinds of documents, for example, a legal document, a financial document, a scientific document, and each of which is stored in different ASPs, the user must search, find and access an ASP that provides the desired documents. When a number of different kinds of documents are desired, the user may have to search, find and access several ASPs. This multiple searching requirement is time consuming for the user. In addition, because various ASPs may provide documents using different formats, the user may have to re-format the documents so as to obtain documents of a single format. This re-formatting is also burdensome on the user. Because most ASP charge their customers for their services rendered, typically on a pay-per-use basis or a contract basis, the customers, or users, may have to pay several bills, one for each ASP used. This multiple billing system thus imposes an extra burden on the user.

In additions, while users of ASPs may be legal experts such as attorneys, medical experts such as doctors, or financial experts, users may not have any expertise in searching, formatting, organizing, updating, protecting, or in general managing documents retrieved from ASPs. Users therefore waste time attempting to learn about document managing on their own, often by a costly trial and error process.

SUMMARY OF THE INVENTION

Accordingly, one object of the present invention is to solve the above-noted problems and improve upon the noted inefficiencies.

Another object of the present invention is to provide a system for managing documents, which assists users in managing documents. For instance, the system for managing documents according to the present invention may include a consulting device configured to provide consulting advices to users on searching, accessing, formatting, organizing, updating, protecting documents based on the users' specific needs, or based on the users' specific business activities and/or goals.

Another object of the present invention is to provide a system for managing documents, which includes a user interaction device configured to exchange data with the users, for example names, passwords, search words, document type and format, or documents. The user interaction device thus permits the users of the system to input data to, and to retrieve data from, the system.

Another object of the present invention is to provide a system for managing documents, which includes a search engine configured to search for an ASP providing a specific service requested by a user. Optionally, the search engine may be configured to search for documents in individual ASPs, for example when an ASP does not have a search engine of its own.

Another object of the present invention is to provide a system for managing documents, which includes a formatting mechanism configured to format a document retrieved from an ASP in a format requested by the user.

Another object of the present invention is to provide a system for managing documents, which permits users to store documents from the user at the ASPs.

Another object of the present invention is to provide a system for managing documents from ASPs, which includes a bill generator configured to generate a unified bill from different bills received from different ASPs.

Another object of the present invention is to provide a method for managing documents, which assists users in managing documents. For instance, the method for managing documents according to the present invention may include a step of providing consulting advices to users on searching, accessing, formatting, organizing, updating, protecting documents based on the users' specific needs, or based on the users' specific business activities and/or goals.

Another object of the present invention is to provide a method for managing documents, which includes a step of exchanging data with the users, for example names, passwords, search words, document type and format, or documents.

Another object of the present invention is to provide a method for managing documents, which includes a step of searching for an ASP providing a specific service requested by a user. Optionally, the method may include a step of searching for documents in individual ASPs, for example when an ASP does not have a search engine of its own.

Another object of the present invention is to provide a method for managing documents, which includes a step of formatting a document retrieved from a ASP in a format requested by a user.

Another object of the present invention is to provide a method for managing documents, which includes a step of storing documents from a user at an ASP.

Another object of the present invention is to provide a method for managing documents, which includes a step of generating a unified bill from different bills received from different ASPs.

Yet another object of the present invention is to provide a computer program product, which assists users in managing documents. For instance, the computer program product according to the present invention may provide consulting advice to users on searching, accessing, formatting, organizing, updating, protecting documents based on the users' specific needs, or based on the users' specific business activities and/or goals.

Another object of the present invention is to provide a computer program product, which exchanges data with the users, for example names, passwords, search words, document type and format, or documents.

Yet another object of the present invention is to provide a computer program product, which searches for an ASP providing a specific service requested by a user. Optionally, the computer program product may search for documents in individual ASPs.

Another object of the present invention is to provide a computer program product, which formats a document retrieved from an ASP in a format requested by a user.

Another object of the present invention is to provide a computer program product, which stores a document from a user at an ASP.

Another object of the present invention is to provide a computer program product, which generates a unified bill from different bills received from different ASPs.

To achieve these and other objects, the present invention provides a computer based system managing documents from ASPs. The system according to the present invention typically includes a computer program, which receives data input from a user, data output from an ASP based on the user input, transforms the received data in some desired way, and then outputs the transformed data stream to the user. For example, the computer program receives a search request or a request for a specific document from a remote user; selects an ASP based on the request; forwards the request to the ASP; and receives information from the ASP indicating information, such as billing information, the document itself, or the document's URL, of a document provided from the ASP to the user.

Alternatively, a computer program receives data from the user and transmits the to the ASPs. For example, the computer program receives a request to transfer a document from a user. The computer program further receives the document and storage information from the user, then select an ASP based on the storage information; and transmits the document and at least part of the storage information to a storage device of the ASP.

BRIEF DESCRIPTION OF THE DRAWINGS

FIGS. 5A1, 5A2, and B-E show flowcharts of a method of managing documents implemented by a document manager according to one embodiment of the present invention.

DESCRIPTION OF THE PREFERRED EMBODIMENTS

Figure 2:
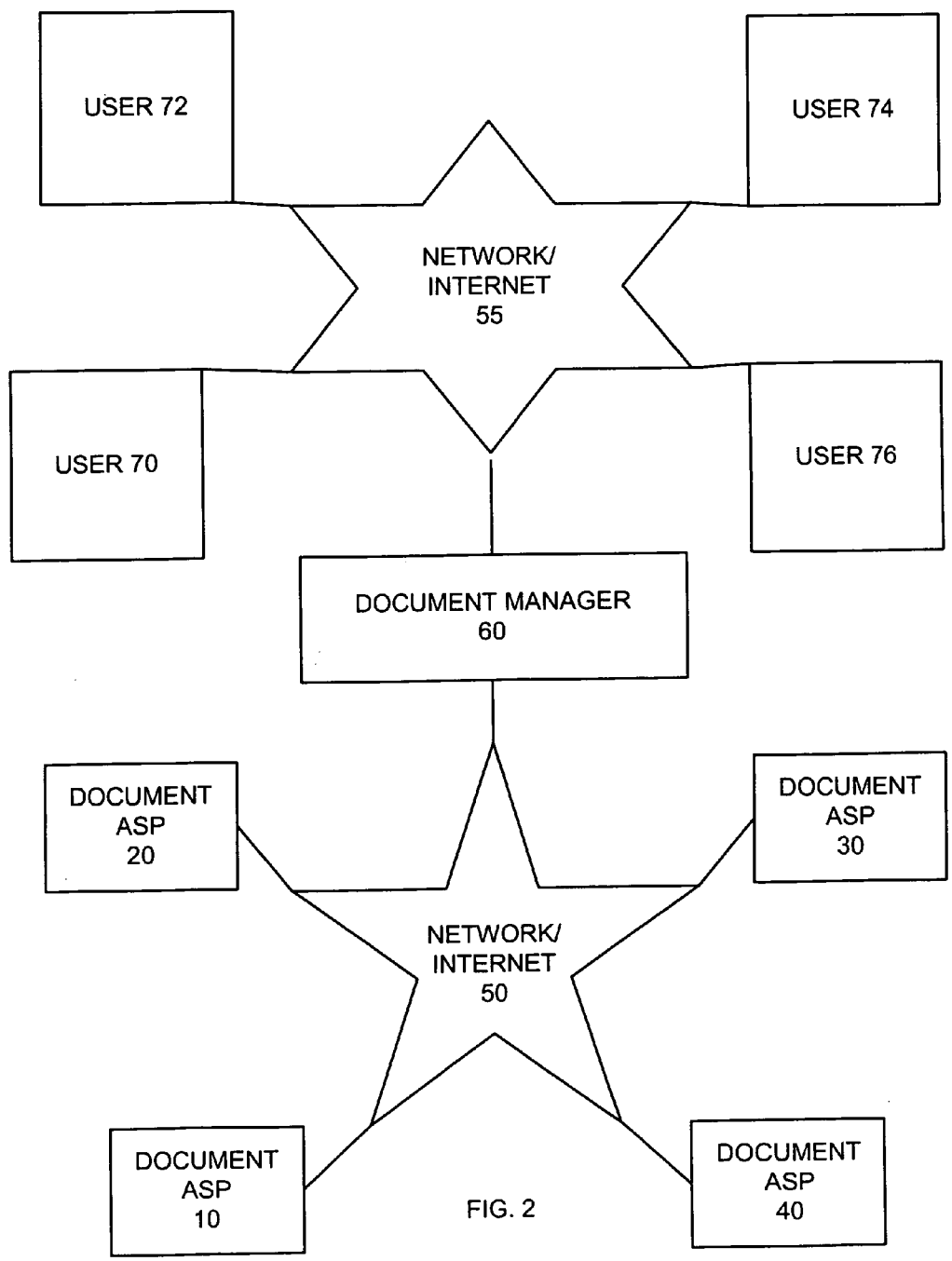
FIG. 2 is a block diagram showing an overall system configuration according to the present invention.

Referring now to the drawings, wherein like reference numerals designate identical or corresponding parts throughout the several views, FIG. 2 is a block diagram of a system for managing documents according to the present invention. The system includes a network 50 that interconnects at least one, but preferably a plurality of ASPs 10-40, a document manager 60, and at least one user 70, but preferably a plurality of users 70, 72, 74 and 76 connected to the document manager 60 via a network 55. The users 70, 72, 74 and 76 are thus remote users with respect to the document manager 60. The networks 50 and 55 are preferably the Internet, but can also be a local area network, a wide area network, any type of network such as an intranet, an extranet, or a combination thereof. An extranet may be used to provide controlled access to external users, for example through the Internet. How the users 70 and the document manager 60 can be connected to the Internet 50 and 55 is well-known in the art and is explained for example, in part 38 of "How Computers Work", by Ron White, Que Corporation, pps. 340-349, September, 1999, ISBN: 0-7897-2112-0, the entire content of this book being incorporated by reference. Other communications links for networks 50 and 55, such as a virtual private network, or a wireless link, may be used as well.

Figure 3:
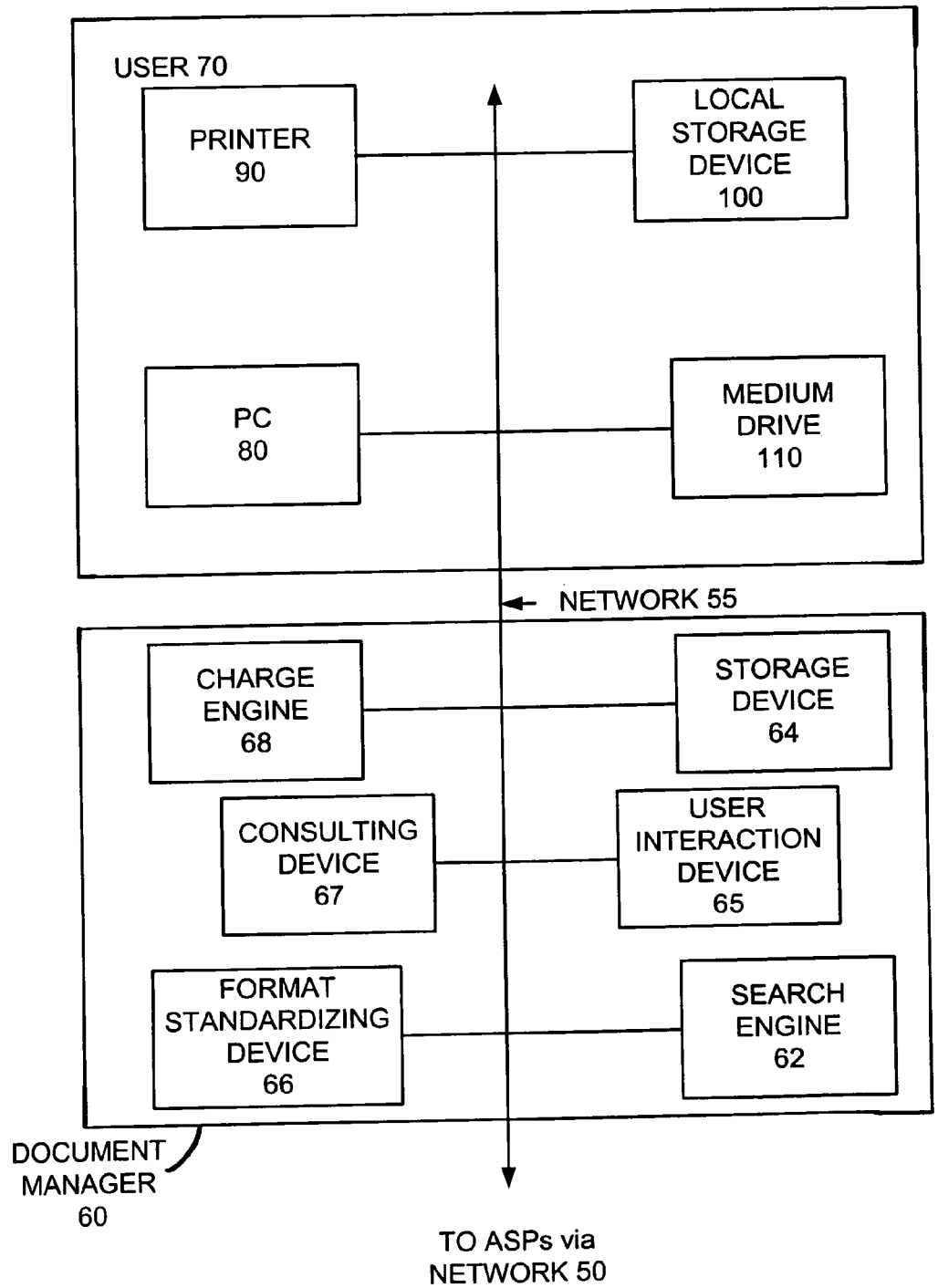
FIG. 3 is a block diagram illustrating a document manager and the user according to one embodiment of the present invention.

FIG. 3 is a block diagram illustrating the user 70 and the document manager 60 in more detail. As shown in FIG. 3, the users 70, 72, 74 and 76 can include a PC 80, a printer 90, a local storage device 100, or a medium drive 110, or a combination of them. Alternatively, the users 70, 72, 74 and 76 may also include a multifunction copier (not shown), or other multifunction devices such as the Ricoh eCabinet™.

In the embodiment shown in FIG. 3, user 70 may interact (exchange data) with the document manager 60 via the user interaction device 65, so as to benefit from a number of services provided by the document manager 60. Based on data inputted from the user 70 and received by the user interaction device 65, the document manager 60 can provide consulting services via the consulting device 67 to the user 70 regarding document management in general. For example, consulting device 67 can be configured to provide advice to user 70 on topics such as document search strategies, document retrieval costs, document storage organization, updating documents, protection of secured documents, delivery options of documents, etc. In a preferred embodiment, consulting device 67 provides electronic and automated advice to user 70 based on data inputted by user 70 via user interaction device 65. For example, the consulting device 67 may be programmed to asked a series of questions to the user 70, and provide the user with a search strategy, or storage strategy based on the user's answer. The questions asked by the consulting device 67 can be generic and predetermined for any users, or can generated by the consulting device 67 based on previously acquired data from the user. The document manager 60 and the components thereof may be implemented using any desired structure such as a programmed general purpose computer, server, a combination of a server with other computers, or using any desired hardware, and any desired software or firmware.

As noted above, the document manager 60 includes a user interaction device 65 with which the user 70 can interact via network 55. In one embodiment, the user 70 may access document manager 60 by signing on, for example using a user-name and a password, which can be verified by user interaction device 65. If the user is not a registered user, the user interaction device 65 can request information from the user so as to generate a membership. The user interaction device 65 also receives the input data from the user regarding the type of documents the user is requesting. The user may also input a requested document format, or user information such as e-mail addresses, postal addresses, telephone numbers, or information about the type of document management needed by the user 70. The user interaction device 65 can either request more information from the user and/or provide the user 70 with document managing advice, strategies, and information, for example via the consulting device 67. The user interaction device 65 may also provide the user with the ASP addresses from which requested documents are available, or may transmit to the user 70 the requested documents, and the unified bill.

The document management 60 also includes a search engine 62 configured to search and access ASPs based on data input from the user 70, for example via user interaction device 65. The search engine 62 is also configured to retrieved documents. Advantageously, the user need only input information related to the document required and not related to the ASP from which the desired document is to be retrieved. The search engine 62 can also be configured to search the individual ASPs for documents when the ASPs do not have a search engine available. Search engines are well-known in the art and are explained for example, in part 32 of "How The Internet Works", by Preston Gralla, Que Corporation, pps. 185-189, August 1999, ISBN: 0-7897-2132-5, the entire content of this book being incorporated by reference.

The document manager 60 also includes a storage device 64, which may store all the documents requested by the user 70, in their original formats and/or in their standardized format. The storage device 64 may also include the URL's of the ASPs from which a document was retrieved, and/or the billing information from each ASP from which the searching engines retrieved documents. The storage device 64 may also store user information, such as user-names, user passwords, e-mail addresses, postal addresses, telephone numbers, current and prior type of documents requested, current and prior document management strategies for specific users, current and prior user-requested searches, and/or searching parameters. In one embodiment, the storage device 64 is accessible by the user, for example via the user interaction device 65.

The storage device 64 can include, but is not limited to, any type of disk including floppy disks, optical disks, CD-ROM, magneto-optical disks, ROMs, RAMs, EPROMs, EEPROMs, Flash Memory, Magnetic or Optical Cards, or any type of media suitable for storing electronic instructions and/or data. Moreover, the storage device 64 may include a database, i.e., a digital repository, that may be implemented, for example, through a commercially available relational database management system (RDBMS) based on the structured query language (SQL) such as ORACLE, SYBASE, INFORMIX, or MICROSOFT ACCESS, through an object-oriented database management system (ODBMS), or through custom database management software.

The document manager 60 may also includes a format standardizing device 66 configured to standardize the formats of the documents retrieved from various ASPs. For example, the format standardizing device 66 can re-format the documents so that they may be accessed using a single GUI. Such re-formatting devices are well-known in the art. In one embodiment, the format standardizing device 66 receives the standard format from the user interaction device 65 and stores the standardized documents in the storage device 64. The documents to be formatted by the format standardizing device 66 can be received from the ASPs via network 50, from the user 70 via the network 55, from the storage device 64, or from the user interaction device 65.

The document manager 60 may also include a charge engine 68 configured to charge the user 70 with a unified bill. For example, the unified bill can correspond to the sum of the bills received from the ASPs. The bills from the ASPs can be received from the ASPs or the user interaction device 65, and can be forwarded to the user interaction device 65, or to the storage device 64 for storing, or to the user 70 via network 55.

The document manager 60 described above can provide consulting advice to the user, generate document managing strategies for the user based on the user's specific needs, retrieve and organize the addresses of, and links to, ASPs 10-40, retrieves documents from the ASPs 10-40, stores the documents, formats the documents, bills the user a unified bill, and/or transmits the documents to the user to be viewed on the screen of the PC 80, printed with printer 90, or stored in the local storage device 100 and/or medium drive 110. The document manager 60 thus provides the user with access-to-ASP services, the ability to retrieve-from-ASPs, a consistent user interface, a single sign-on service, the ability to request a single search for different documents and different document types, a single billing service, and a flexible storage service. The document manager 60 may also suggest to the user and provide the user with online print and delivery services, for example by ordering documents from the ASPs and securing their delivery to the user via a courier. In this embodiment, the document manager 60 can contract with the ASPs and the courier service to ensure proper delivery, to be the user's agent that keeps track of the delivery, and to inform the user of the status of the delivery. The document manager 60 can also generate a single bill for its services and those of the ASP and courier used.

The document manager 60 may also provides the user 70 with the links to the ASP documents so that the user may access the documents via the document manager 60 without having to store any document at the computer of the user, nor at the document manager 60, if desired. In this respect, the user 70 benefits from the searching, retrieving and storing known-how of the ASPs. In this embodiment, the ASP can charge a fee for access to their documents. In one embodiment, the fee may be incorporated into a unified bill generated by the document manager 60 and provided to the user 70 for its benefit. The term "unified bill" herein means a bill that includes the charges of at least two bills.

Furthermore, the document manager 60 permits the user to retrieve documents and to store the documents on a local storage device, either permanently or temporarily. Alternatively, the document manager allows the user 70 to store a document at the ASP. For example, the document manager 60 may be in a partnership with the ASPs to provide storage at the ASPs for documents of users, i.e. customers, of the document manager 60. For instance, a user may decide to store sensitive legal documents, insurance contracts, or digital certificates on a local storage device for a predetermined period of time, and have the documents protected from loss, theft, fire, disaster, etc. by storing them at an ASP, which may provide better protection for the secured documents. In this case, the user benefits from the ASP's know-how for handling and protecting secured documents. In this embodiment, the ASP can charge a fee for the storage. In one embodiment, such a fee would be included in a unified bill computed by the document manager for the benefit of the user.

Advantageously, the user does not have to be aware of the different ASPs used by the documents manager 60 to create the collection of documents retrieved and transmitted to the user, and used to store documents at the ASPs. Therefore, the user may deal with a single user interface when receiving the requested documents and when transmitting the user documents to be stored at the ASPs. In addition, the unified billed, generated by the ASPs for either searching, delivering, or storing documents, provided by the document manager 60 also alleviates the burden on the user 70 to pay several different bills.

The document manager 60 thus provides a single stop for consulting, billing, formatting, obtaining, reviewing, storing, and managing a variety of types of documents, such as legal, financial, insurance, engineering, accounting, or general office, educational, medical, governmental agencies documents.

Figure 4:
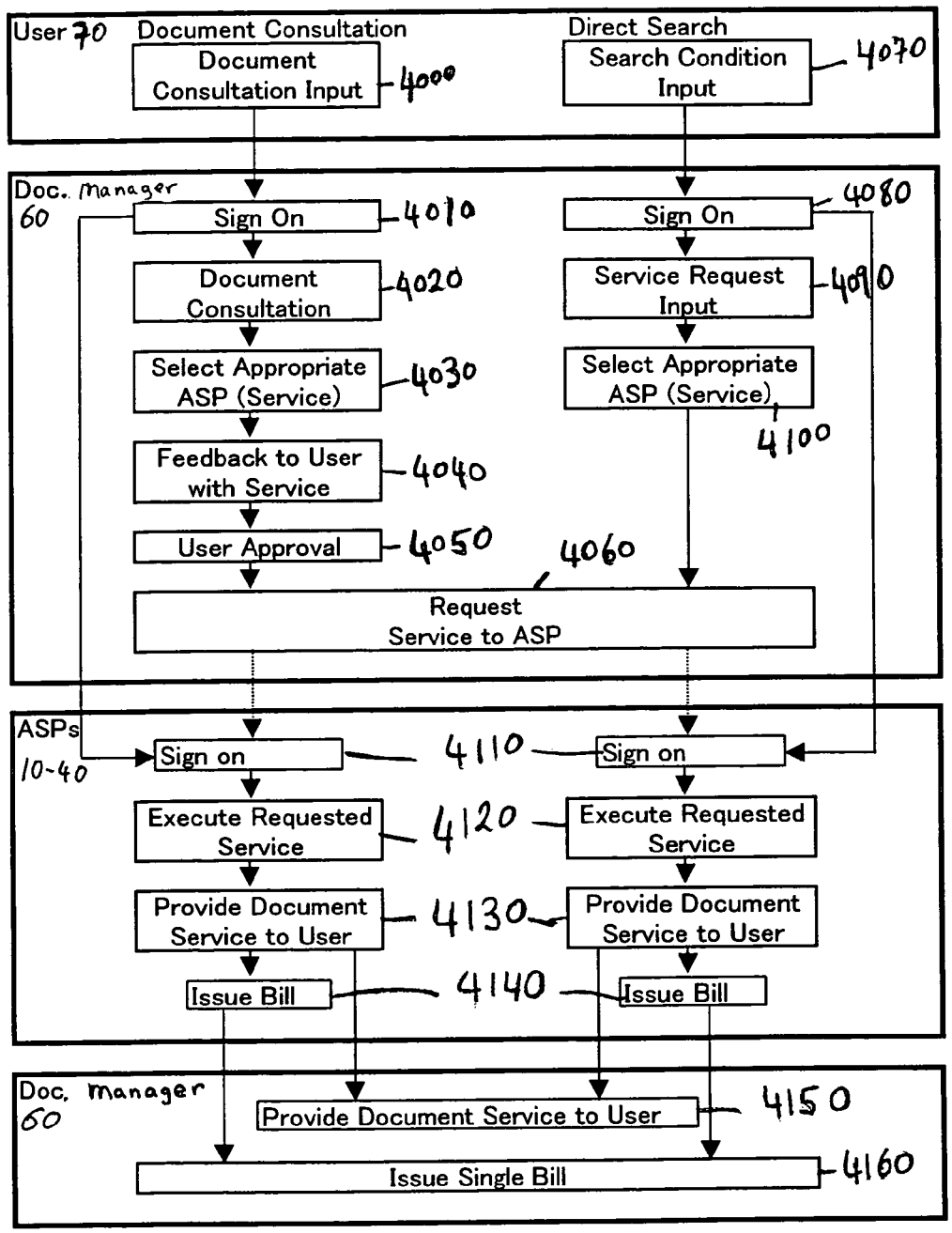
FIG. 4 is a block diagram illustrating the functionality of a system according to one embodiment of the present invention.

FIG. 4 is a flowchart showing the functionality of the document management system according to one embodiment of the present invention. As shown in the embodiment of FIG. 4, document manager 60 offers user 70 at least two types of services. As illustrated on the left of the diagram, the user 70 can access the document manager 60 for document consultation, and as illustrated on the right the user 70 can access the document manager 60 for a direct search. For the document consultation service, the user 70 inputs data related to the type of document consultation requested at step 4000, for example, the type, number, format of documents needed, the budget available for the service, the time constraints for completing the service, the level of security required, etc. At step 4010, the user 70 signs on the document manager 60, for example by providing a user-name and password. Once the user is signed on, the document manager 60 performs a document consultation at step 4020, for example, with the consulting device 67, which can generate a strategy for the service requested based on the inputted information from the user 70, or by asking further questions. Based on the document consultation, the document manager 60 selects the ASPs appropriate for the service requested by the user 70 at step 4030. The document manager 60 sends the user 70 feedback on the selection of the ASPs, at step 4040 for example indicating the costs and time of the service. Upon approval from the user 70 at step 4050, the document manager 60 requests the service from the ASPs at step 4060.

For the direct search service, the user 60 can input the search requested at step 4070. At step 4080 the user signs on the document manager and the user request is inputted at step 4090. The document manager 60 then selects the ASPs appropriate for the requested service at step 4100 and requests the service from the ASPs at step 4060.

For both services, the document manager signs on to the ASP to request the service at step 4110. In other words, if the user signs on the document manager 60, the user can access several ASPs without signing on each ASP. Once the ASPs receive the requested service, the ASPs perform (execute) the service at step 4120, for example, search for a specific document, provide the document to the user at step 4130 and bills the document manager 60 at step 4140. The document manager 60 then provides the document(s) to the user 70 at step 4150 and issue a single bill to the user for all services performed at step 4160.

For both services, the user 70 has the option of signing-on the document manager 60 at step 4010 and 4080 and the ASPs 10-40 at step 4110 and placing the request. This may be beneficial when the user knows which ASP can provide the desired service. In this case, the document manager 60 can still perform the services of issuing a single bill, or reformatting the documents in accordance to the user's requested format, and/or securing the proper delivery of the document to the user, etc.

Figure 1:
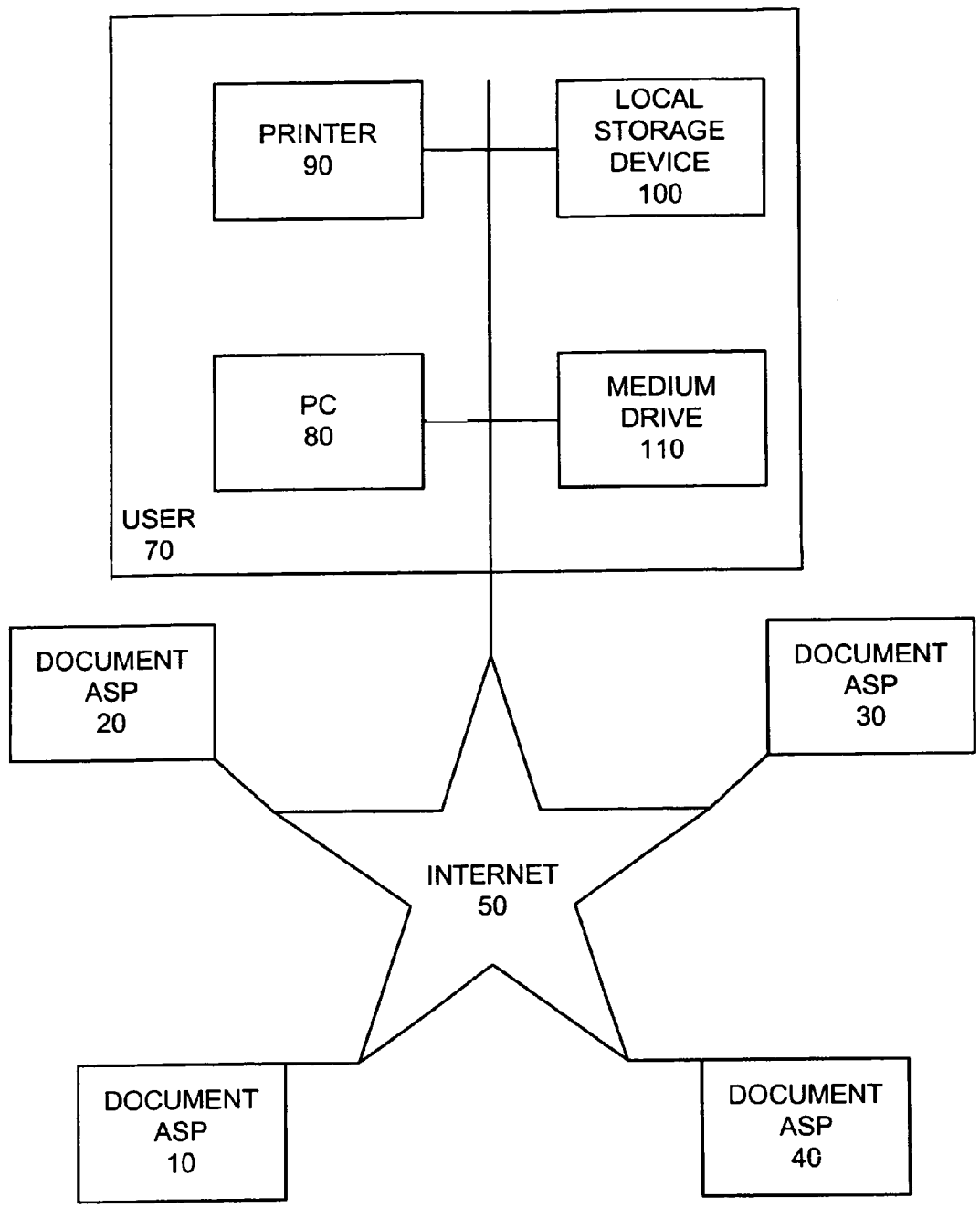
FIG. 1 is a block diagram showing a conventional ASP/user network.
Figure 5B:
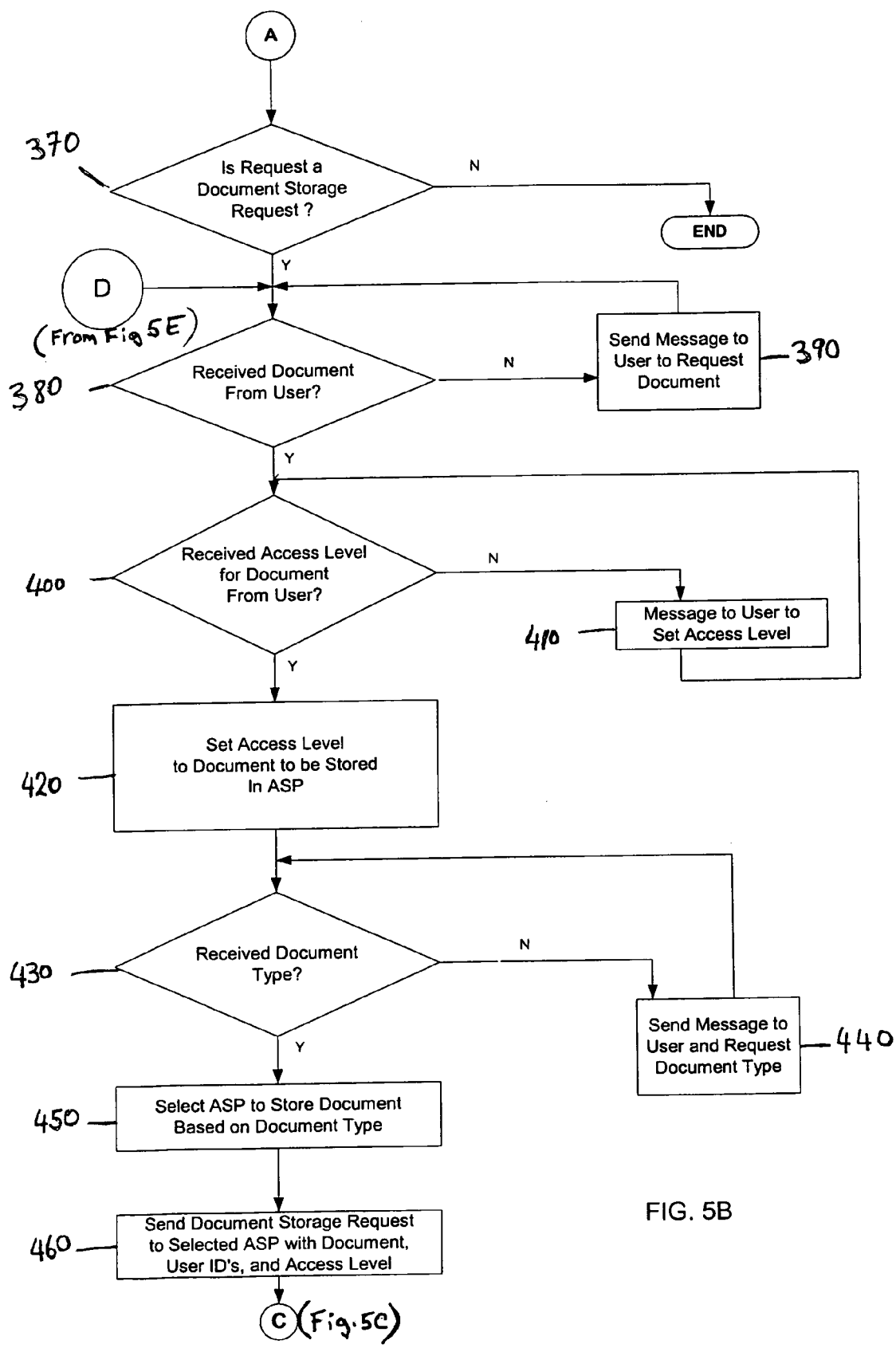

FIGS. 5A-E show flowcharts illustrating a method of managing documents according to one embodiment of the present invention, which can be implemented by the system shown in FIGS. 2-3 and 7-8. As shown in FIG. 5A1, in step 300 the document manager 60 inquires whether a request is received, e.g. from a user input. If no request is received, the document manager 60 loops and returns to step 300. Otherwise, the document manager 60 inquires at step 310 whether the user is a registered user. If the user is not registered, the document manager requests account information from the user at step 320. At step 330, the document manager checks that the account information has been received. If the information is not received, the document manager loops and returns to step 330. If the information is received, the document manager 60 registers the user's ID at step 340 and sets the access level based on the registered user's ID at step 350.

The access level used by the method of the present invention is described next. As noted above, the document manager 60 permits storing of documents at the ASPs 10-40. In other words, the user 70 may transmit documents to the ASPs 10-40 for storage via the document manager 60. These documents may be downloaded from the user's local storage device 100 or medium drive 110, or generated by the user's PC 80, scanner, digital copier, facsimile machine, printer, or multi-function printer connected to the network 55. In a preferred embodiment, the documents stored at the ASPs 10-40 are stored with an access level associated with them. The access level identifies the documents which a specific user can access at the ASPs via the document manager 60. The user 70 may assign an access level to each document stored at the ASP. During a retrieval operation, the user's ID is transmitted to the document manager 60 so that the user's ID can be registered at step 340 and an access level set based on the user's ID at step 350. Because the access level is assigned to each user, the document manager 60 retrieves documents that match the user's access level. As a result, security management can be accomplished and the search time can be reduced. The access level for each user can be stored in the document manager 60, for example in storage device 64. When documents are stored in the ASPs, the access level can be set with each document. The access level for each stored document can be stored at the ASPs. When the document manager 60 executes a document retrieval operation, the document manager's search engine 62 and/or the ASPs' search engine execute the retrieval operation only for documents having an access level matching the user's access level. Consequently, the retrieval time is shortened and high security documents can be accessed by only appropriate users.

An example of an access level scheme applicable to the present invention is an access level that includes three sections:

(1) a first section to identify the business entity to which the document pertains, for example a group of companies (A), an individual company (B), or an individual subsidiary (C), etc. . . . ;

(2) a second section to identify the department to which the document pertains, for example the legal (1), finance (2), marketing (3), or R&D department (4), etc. . . . ; and (3) a third section to identify the individual (Laura, Jim, Caroline, Phil . . . ) who created the document.

For example, a user with the access level B-2-% would have access to all (%) marketing documents (2) related to company B. Alternatively, a user having the access level A-%-Jim would have access to only the documents created by Jim, in any department (%) of the group of companies (A). Under this exemplary scheme, a legal document created by Phil for the subsidiary C would have an access level of C-1-Phil.

Returning now to FIG. 5A1, the document manager 60 inquires whether the request is a request to retrieve a document from an ASP at step 360. If the request is not a request to retrieve a document, the document manager 60 inquires at step 370 (see FIG. 5B) whether the request is a request to store a document in an ASP. If the request is not a storage request, the document manager's routine can end. If the request is a storage request, the document manager 60 inquires at step 380 whether the document to be stored has been received form the user. If not, the document manager 60 contacts the user at step 390 to inform the user that the document was not received and to request the user to send the document. Once the document is received, the document manager 60 inquires at step 400 whether the access level for the document was received. If the access level was not received, the document manager 60 sends a message to the user at step 410 to ask for the access level of the document. Once the access level of the document to be stored is received by the document manager 60, the document manager 60 sets the access level to the document at step 420. The document manager 60 then inquires at step 430 whether the type of document has been received. If the document type was not received, the document manager 60 sends a message to the user at step 440 to ask for the document type. Once the document type is received, the document manager 60 selects an ASPs at step 450 to store the document based on the document type. In one embodiment, the document manager 60 uses a table stored in storage device 64 to select the ASP for storage of the document. For example, the table associates all legal documents to be stored with a first ASP, all finance documents with a second ASP, all insurance documents with a third ASP, all marketing documents with a fourth ASP, etc. . . . . At step 460, the document manager 60 sends the document to be stored to the selected ASP, along with the user ID, and the document access level.

Figure 5C:
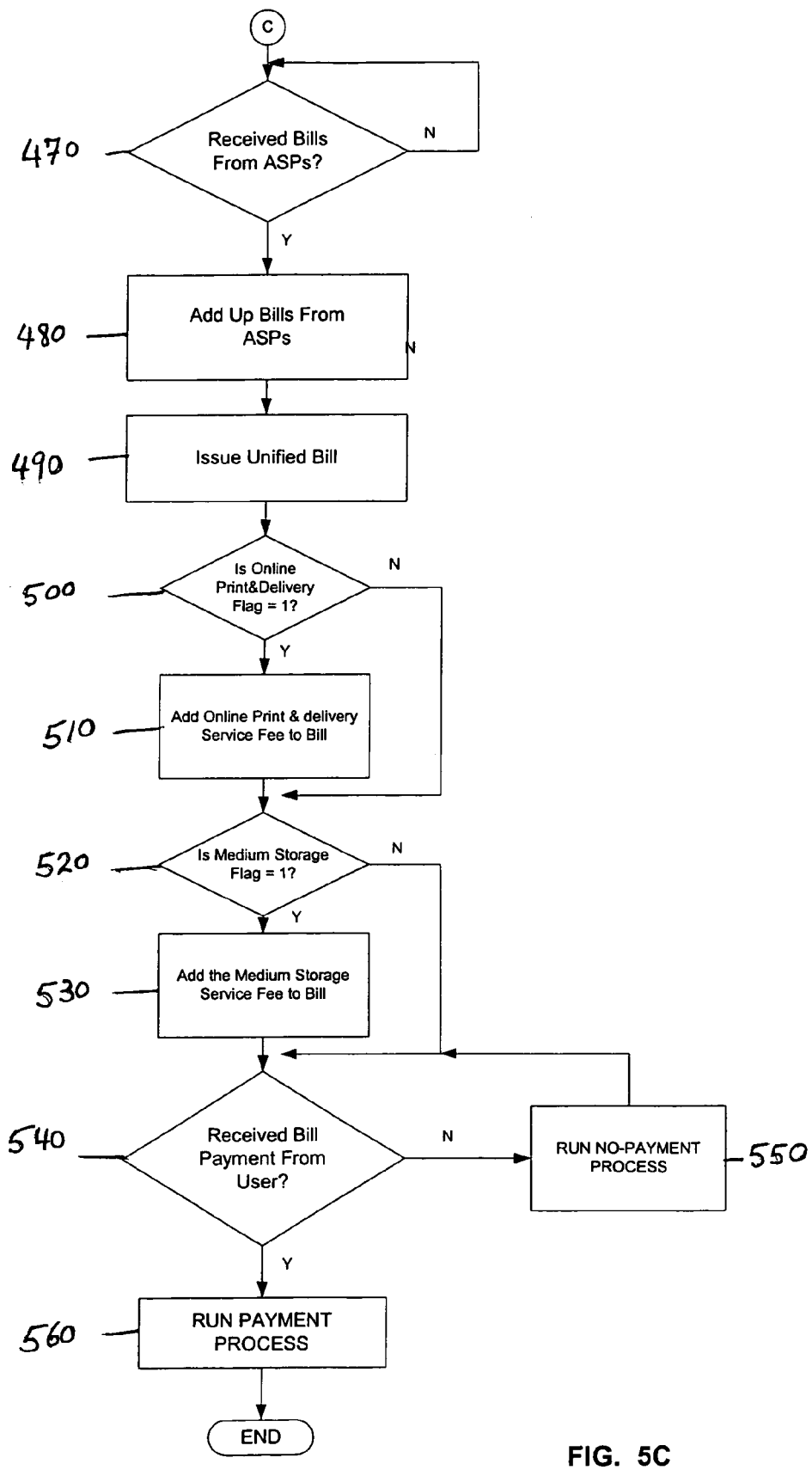

The document manager 60 then can go through a billing routine, for example as shown in FIG. 5C. At step 470 the document manager 60 inquires whether all bills have been received from the various ASPs. Once all bills are received, the document manager 60 adds up the bills at step 480, and issues a unified bill at step 490. At step 500, the document manager 60 checks if the online print and delivery service was performed, i.e., whether the online print and delivery flag is equal to one. The online print and delivery service is described in detail below. If the online print and delivery service was performed, then the document manager 60 adds an online print and delivery service fee to the bill at step 510. Otherwise, the program manager 60 goes to step 520 and inquires whether a storage medium service (described below) was performed. If the storage medium service was performed, the document manager 60 adds a storage medium service fee to the bill at step 530. Otherwise, the document manager 60 goes to step 540 and inquires whether payment was received at step 540, either by the user or by a payment company contracted by the user. If no payment is received for the bill, the document manager 60 runs a no-payment process at step 550, for example sends a reminder to the user to pay the bill. If a payment is received for the bill, the document manager 60 runs a payment process at step 560, for example sends a receipt to the user. Once the unified bill has been paid by the user, the program manager 60 can end its routine.

Returning to step 360 of FIG. 5A1, if the request received from the user is a request to retrieve a document, the document manager 60 inquires at step 570 whether a key word is received from the user. If no key word is received, the document manager 60 sends a message to the user at step 580 and asks for a key word. Once a key word is received, the document manager 60 sends the request for retrieving a document to the ASPs along with the access level of the user at step 590. Turning to FIG. 5A2, at step 600, the document manager 60 inquires at step 600 whether a message from any ASP informing the document manager 60 that the ASP does not have a search engine. If no such message is received, the document manager 60 sends the key word with the access level of the user to the ASPs at step 610. Otherwise, at step 620, the document manager's search engine 62 executes the search of the ASPs that don't have a search engine by matching documents with the key word and the access level. The document manager 60 inquires at step 630 whether a document was found. If no document was found, the document manager sends a message to the user at step 640 to inform the user that no document was found, and the document manager's routine can end. If a document was found, the document manager 60 retrieves and stores the URL for the document from the ASP, the user's ID, and the retrieval date as the retrieval history. Optionally, the document manager 60 can retrieve and store the document itself. Also optionally, the document manager 60 can re-format the documents according to a format that the user requested. The requested format was either inputted during the present search (steps not shown) or in a previous search by the same user and saved as part of the retrieval history.

Figure 5D:
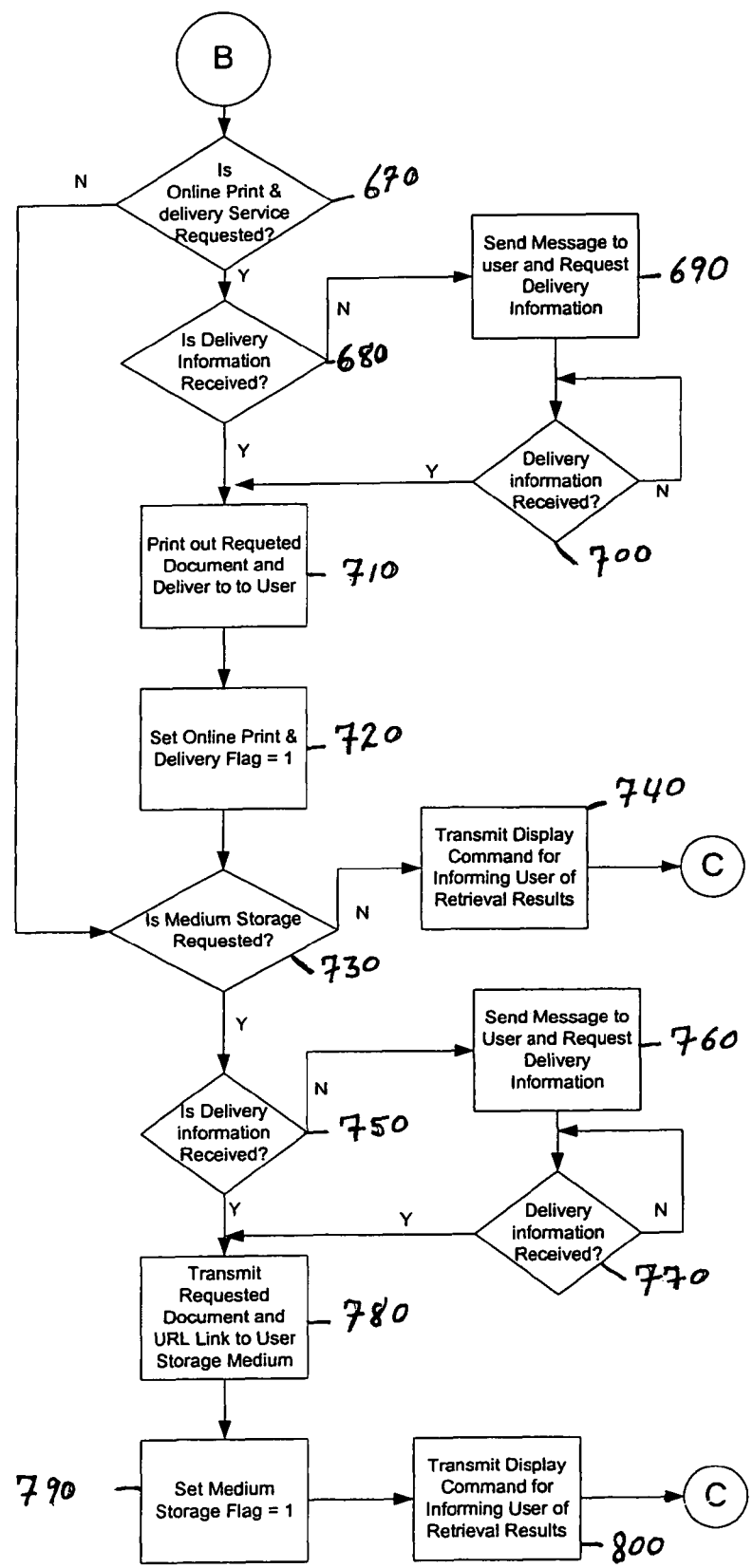

Turning to FIG. 5D, the document manager 60 inquires at step 670 whether an online print and delivery service is requested. If no online print and delivery service is requested, the document manager 60 moves to step 730. If an online print and delivery service is requested, the document manager 60 inquires at step 680 whether the delivery information has been received. The delivery information may include for example the user's e-mail address, street address, facsimile, or telephone number, etc. . . . . If no delivery information was received, the document manager sends a message to the user at step 690 and requests the delivery information at step 510. The document manager 60 inquires at step 700 whether the requested delivery information is received. Once the delivery information is received, the document manager 60 requests at step 710 the ASP to print out the document and to deliver it to the user. Alternatively, the document manager 60 can print out the document and deliver it to the user. The delivery may be performed by a number of devices, for example via e-mail, facsimile, courier, or mail. Additionally or alternatively, an electronic representation of the document may be transmitted to a printing division or company such as Mineo.com (http://www.mineo.com), the document printed, and sent by a delivery service such as Federal Express to the user. Once the online print and delivery service is performed, the document manager 60 assigns at step 720 a value to the online print and delivery service flag, for example the value 1.

At step 730, the document manager 60 inquires whether a medium storage request is received. If no such request is received, the document manager 60 transmits at step 740 a display command to inform the user of the retrieval results. For example, the display command can include the URL of the searched document, the titles of the documents, the document itself, the expected date of delivery (if applicable), or any other information relating the search results. The display command may be displayed on the screen of the user's PC 80, or can be displayed as an e-mail to the user, or a facsimile to the user. Once the display command is transmitted, the document manager 60 can run the billing routine shown in FIG. 5C (described above). In another embodiment, the document manager 60 provides the user with a unified User Interface (UI) along with the display command. For example, when the display command includes a list of retrieved documents with the documents' titles and URLs, the user, who wants to see the retrieved document, can click on the documents, e.g. on the titles of the documents listed. The document manager 60 then accesses the ASP and the desired document is displayed using the ASP's original screen.

If a medium storage request is received at step 730, the document manager 60 inquires at step 750 whether the delivery information is received. In this case, the delivery information can be the user's local storage device 100 address, or the user's medium drive address, or the address of any other storage device accessible by the user. If no delivery information is received, the document manager 60 sends a message to the user at step 760 and requests the delivery information. The document manager then inquires at step 770 whether the requested delivery information is received. Once delivering information is received, the document manager 60 transmits the requested documents at step 780 to the user's storage device based on the delivery information. As an alternative to transmitting the document from the ASP, through the document manager 60, to the user, the document may be transmitted from the ASP to the user without going through the document manager. Once the document transmittal is performed, the document manager 60 assigns a value to a medium storage flag at step 790, for example the value 1. The document manager 60 transmits at step 800 a display command to inform the user of the retrieval results. For example, the display command can include the memory addresses of the stored document, the memory size of the stored document, the URL of the document, the document itself, the expected date of delivery (if applicable), or any other information relating the search results. The display command may be displayed on the screen of the user's PC 80, or can be displayed as an e-mail to the user, or a facsimile to the user. Once the display command is transmitted, the document manager 60 can run the billing routine shown in FIG. 5C (described above).

Figure 5E:
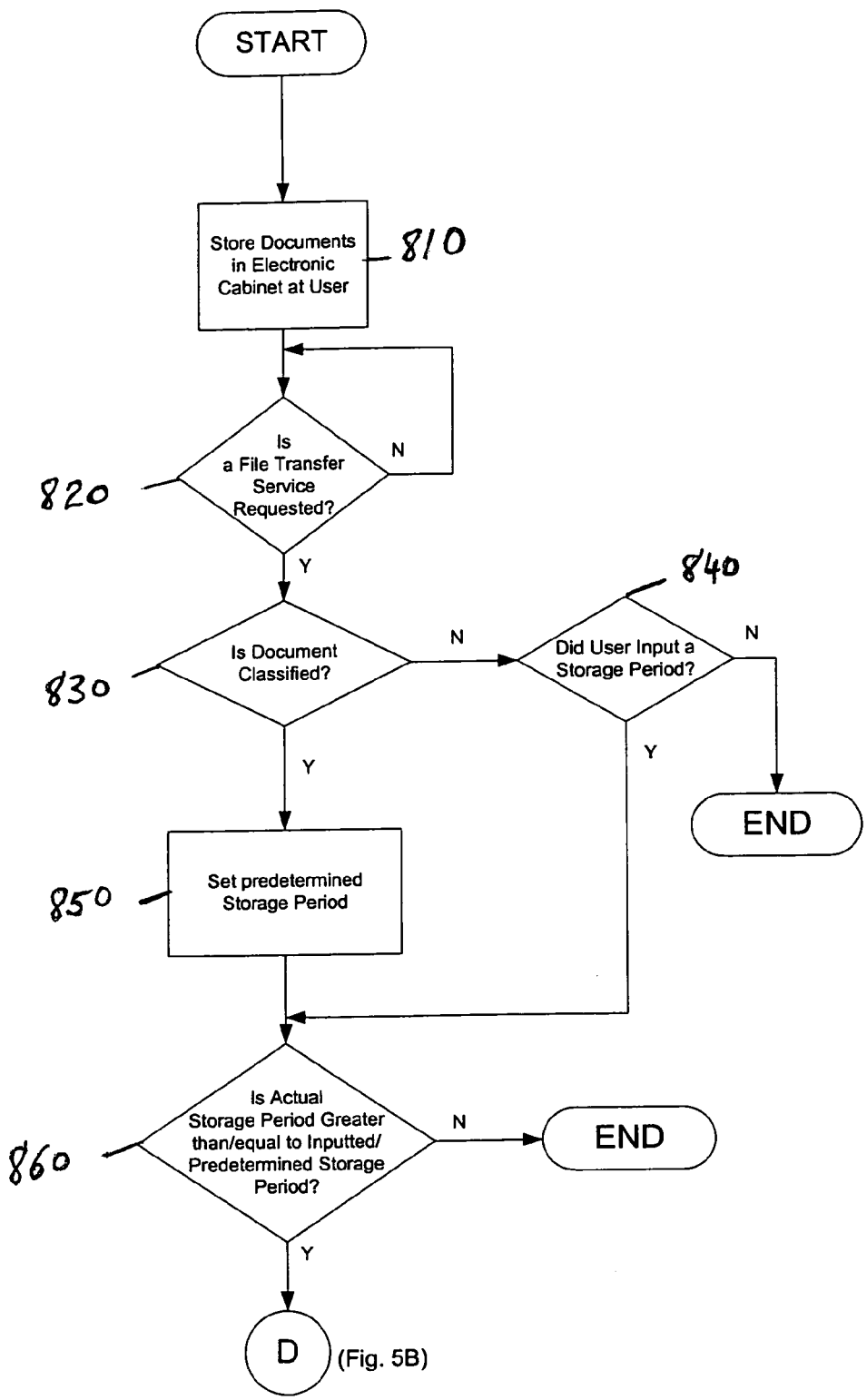

The document manager 60 can help the user manage documents stored at the user, for example in the user's local storage device 100. An example of a method of managing documents stored at the user according to the present invention is shown in FIG. 5E. At step 810, the document manager 60 stores documents in an electronic cabinet, i.e., a storage device such as the user's local storage device 100. The electronic cabinet is connected to the network 55 and stores documents from a variety of sources. For example, the electronic cabinet can store documents generated by the user's PC, scanned by the user's scanner, or retrieved by the document manager 60 from the ASPs, etc. . . . . The document manager 60 inquires at step 820 whether file transfer service is requested. The document manager 60 inquires at step 830 whether the document is classified or categorized in a predetermined category. Examples for predetermined categories are secured or non-secured documents, legal documents, insurance contracts, digital certificates, etc. . . . . In one embodiment, each category is associated with a predetermined storage period of time for storing the document at the user's storage device. This may be accomplished by a table stored on the document manager's storage device 64. If the document is categorized, the document manager 60 sets the predetermined storage period at step 850 based on the document's category. If the document is not classified, the document manager 60 inquires at step 840 whether the user inputted a storage period. If the document is not classified and the user did not specify a period of time for storage, the document manager 60 can end its routine. At step 860, the document manager 60 checks whether the actual period of storage of the document at the user's storage device is greater than (or equal to) the inputted or predetermined period of time for storage. If the actual storage period is greater than the inputted or predetermined storage period, the document manager 60 proceeds to step 380 shown in FIG. 5B for storing a document on the ASP. Otherwise, the document manager's routine can end. In the above, the inputted or predetermined storage period corresponds to a storage time period associated with the specific document to be transferred.

Figure 6:
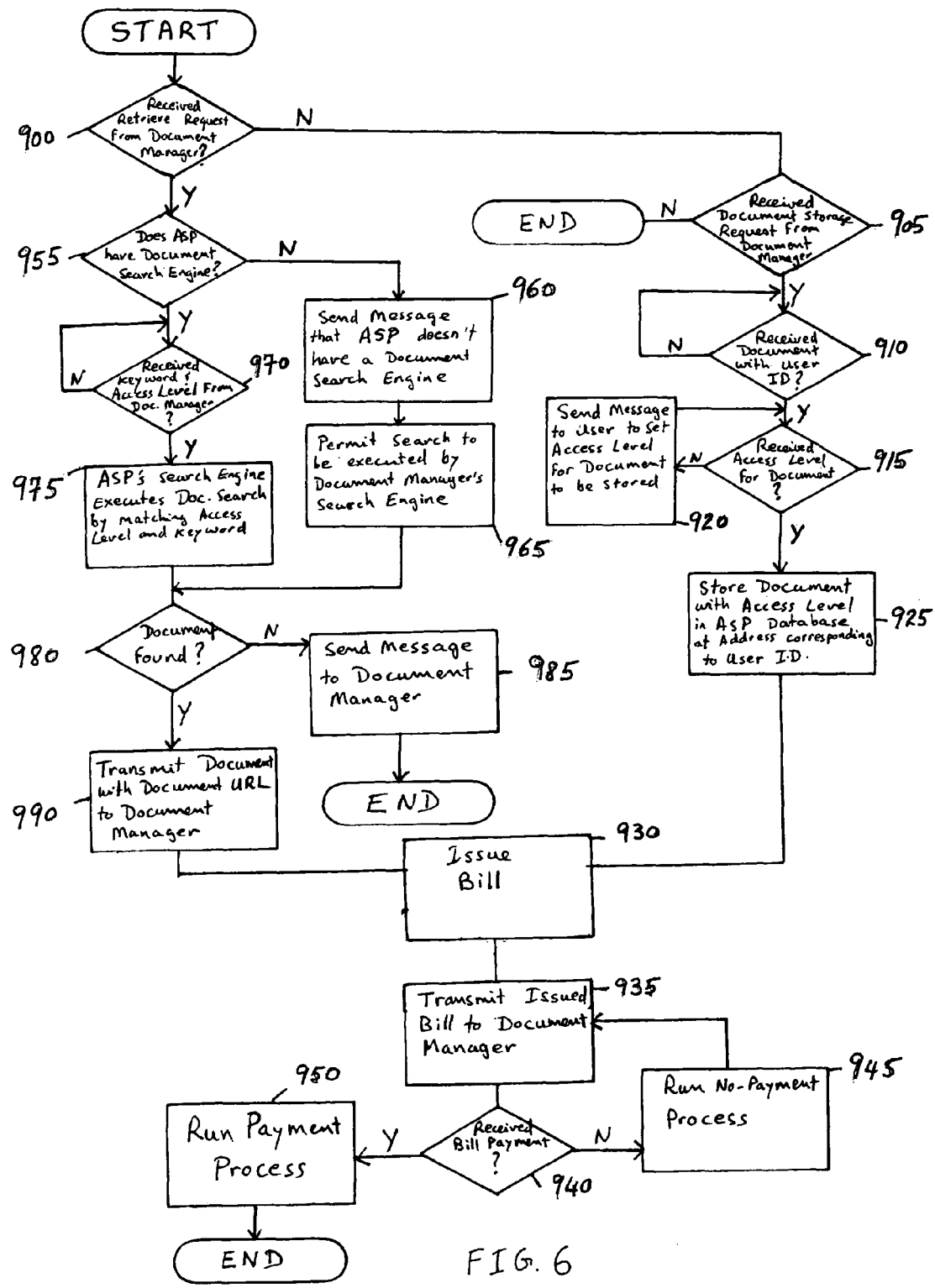
FIG. 6 shows a flowchart of a method of managing document implemented by an ASP according to one embodiment of the present invention.

FIG. 6 shows a method of storing and retrieving documents implemented by an ASP according to the present invention. At step 900, the ASP inquires whether a retrieve request is received from the document manager 60. If not, the ASP inquires at step 905 whether a document storage request is received. If not, the ASP routine ends. If a document storage request is received, the ASP inquires at step 910 whether the document is received with the user's ID. If not, the ASP loops and returns to step 910. When the document is received, the ASP inquires at step 915 whether the access level for the document is received. If not, the ASP sends a message to the user at step 920 and requests the user to set the access level of the document to be stored. When the access level is received, the ASP stores the document at step 925. In a preferred embodiment, the ASP stores the document at an address corresponding to the user's ID. The ASP then issues a bill at step 930 and transmits the bill to the document manager 60 at step 935. The ASP inquires at step 940 whether the bill is paid. If not paid, the ASP runs a no-payment process at step 945, for example by sending the user and/or the document manager 60 a reminder. If the bill is paid, the ASP runs a payment process at step 950, for example by sending the user and/or the document manager 60 a receipt. The ASP's routine can then end.

Returning to step 900, if the received request is a document retrieve request, the ASP inquires at step 955 whether the ASP has a document search engine. If the ASP does not have a search engine, the ASP sends a message to the document manager at step 960, and permits the search to be executed by the document manager's search engine 62. If the ASP has a search engine, the ASP inquires at step 970 whether the key word(s) and access level of the user are received. If not, the ASP loops until the key word(s) and access level are received form the document manager 60. The ASP's search engine executes the search at step 975 based on the access level of the user and the key word(s). The ASP inquires at step 980 whether the document was found. If no document was found, the ASP sends a message at step 985 to the document manager to inform the document manager of the search results. Alternatively, the ASP can send a message directly to the user. If a document was found at step 980, the ASP transmits the document and the URL of the document to the document manager at step 990. The ASP then runs the billing routine of steps 930-950 as described above.

The above methods (FIGS. 4-6) represent exemplary embodiments of the present invention, and the present invention is not limited to the specific steps, nor the order of the steps, presented above. A person of ordinary skill in the art would recognize that the present invention can be implemented using a variety of similar steps in a variety of orders.

Figure 7:
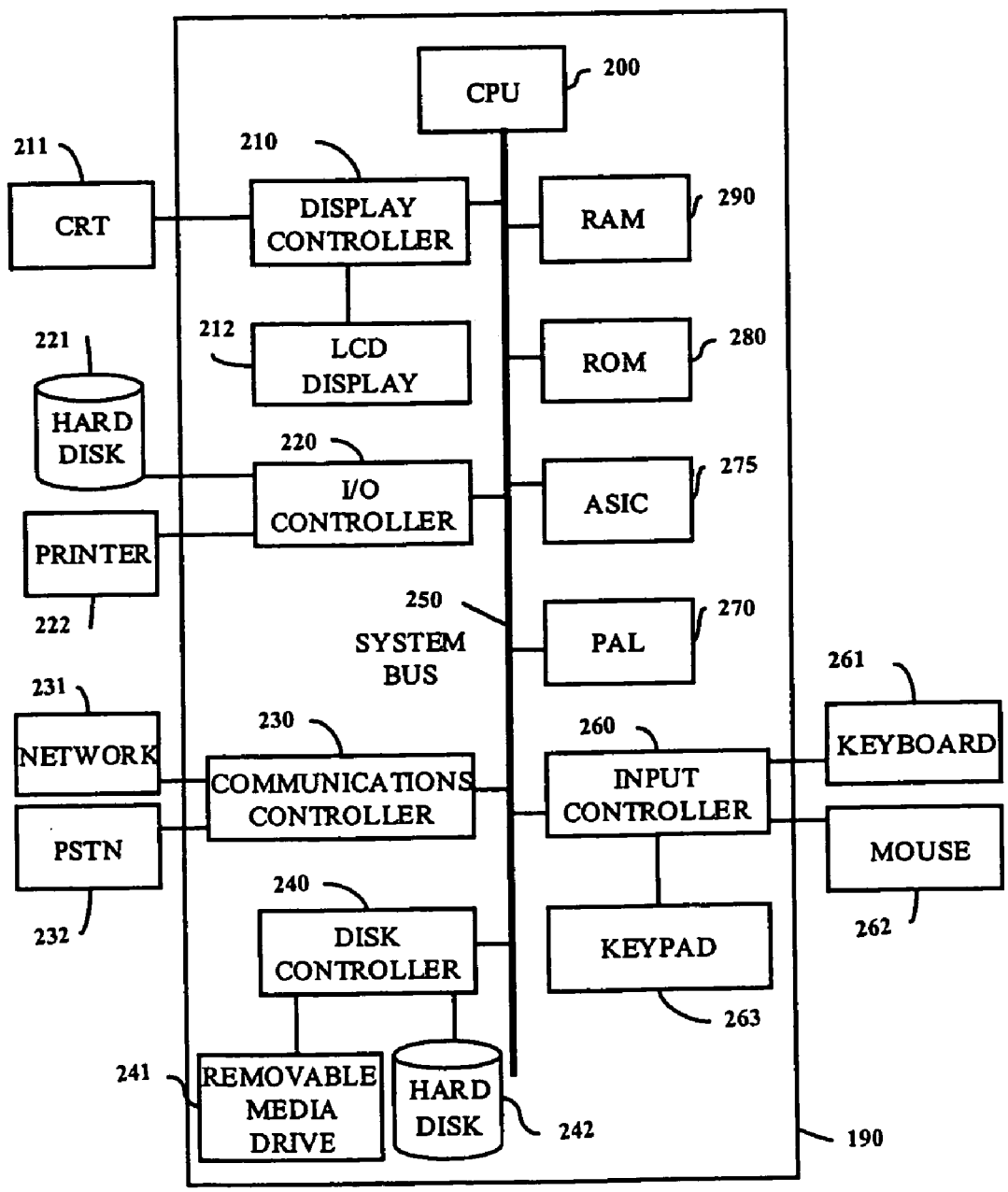
FIG. 7 is block diagram illustrating a device capable of implementing the document manager according to the present invention.
Figure 8:
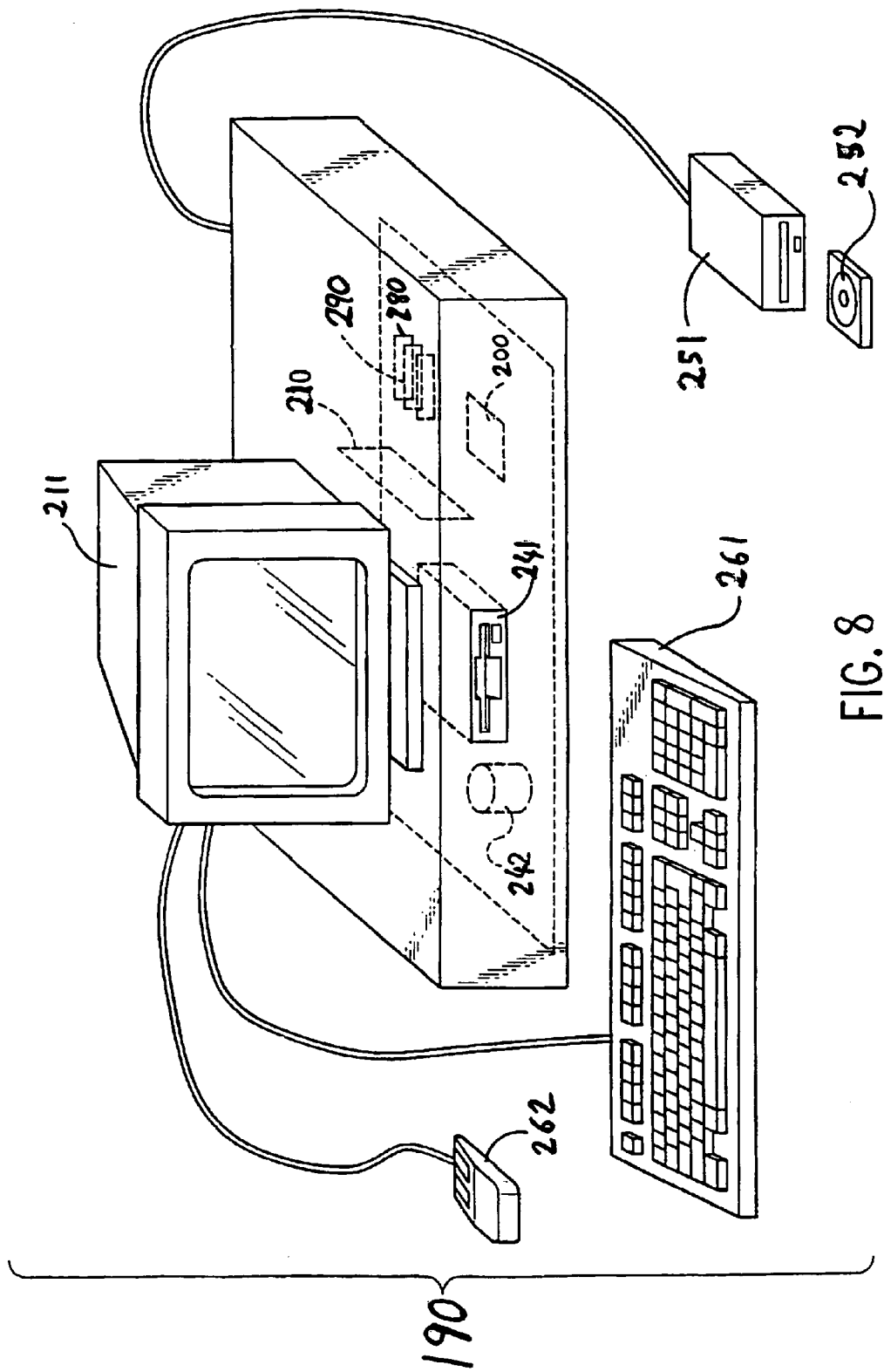
FIG. 8 is schematic representation of a device capable of implementing the document manager according to the present invention.

FIG. 7 is a block diagram of a device 190 that can be used as the user 70 and the document manager 60 shown in FIGS. 2 and 3 and can implement the methods shown in FIGS. 4-6. FIG. 8 is a schematic representation of device 190. The device 190 includes a central processing unit 200 (CPU) that communicates with a number of other devices by way of a system bus 250. The device 190 includes a random access memory (RAM) 290 that hosts temporary storage values used in implementing the document managing functions of the document managers, such as document texts, document graphics, document formats, ASPs' URLs, ASP billing information, etc.

A conventional personal computer or computer workstation with sufficient memory and processing capability may also be configured to operate as device 190. In one embodiment, device 190 operates as the document manager 60, both receiving and transmitting information by users and ASPs. Central processing unit 200 is configured for high volume data transmission and performing a significant number of mathematical calculations in processing communications and database searches. A Pentium III microprocessor such as the 1 GHz Pentium III manufactured by Intel Inc. may be used for CPU 100. This processor employs a 32 bit architecture. Other suitable processors include the Motorola 500 MHZ PowerPC G4 processor and the Advanced Micro Devices 1 GHz AMD Athlon processor. Multiple processors or workstations may be used as well.

The ROM 280 is preferably included in a semiconductor form although other read-only memory forms including optical media may be used to host application software and temporary results. The ROM 280 connects to the system bus 250 for use by the CPU 200. The ROM 280 includes computer readable instructions that, when executed by the CPU 200, perform the different functions discussed above associated with managing documents from ASPs. An input controller 260 connects to the system bus 250 and provides an interface with various peripheral equipment including a keyboard 261 and a pointing device such as a mouse 262. The input controller 260 may include different ports such as a mouse port in the form of a PS2 port or, for example, a universal serial bus (USB) port. The keyboard port for the input controller 260 is in the form of a mini-DIN port although other connectors may be used as well. The input controller 260 provides sound card connections so that external jacks on the sound card allow users to attach microphone speakers or an external sound source. The input controller 260 also may include serial ports or parallel ports as well.

A disk controller 240 is in the form of an IDE controller and connects via ribbon cables to a floppy disk drive 241 as well as a hard disk drive 242, a CD-ROM drive 251 and a compact disk 252 (FIG. 8). In addition, a PCI expansion slot is provided on the disk controller 240 or motherboard that hosts the CPU 200. An enhanced graphic port expansion slot is provided and provides 3-D graphics with fast access to the main memory. The hard disk 242 may also include a CD-ROM that may be readable as well as writeable. A communication controller 230 provides a connection, perhaps by way of an Ethernet connection to a network 231. The network may be a connection to the public switch telephone network (PSTN) 232 for providing Internet access, or a local area network, wide area networks, a virtual private network (VPN), an extranet. In one embodiment, the network 231 and the connection to the communication controller 230 are made by way of a plurality of connections including a cable-modem connection, DSL connection, dial-up modem connection, and the like that connect to the communication controller 230.

An input/output controller 220 also provides connections to external components such as an external hard disk 221, printer 222, for example, by way of an RS 232 port and a SCSI bus. For more information on how the input/output devices operate according to the present invention, such devices are described in part 5 of "How Computers Work", by Ron White, Que Corporation, pps. 184-276, September, 1999, ISBN: 0-7897-2112-0, the entire content of which is hereby incorporated by reference.

A display controller 210 interconnects the system bus 250 to a display device, such as a cathode ray tube (CRT) 211. While a CRT is shown, a variety of other display devices may be used such as an LCD (liquid crystal display), or plasma display device. As noted above, the components shown in FIG. 5 can be included in both the user 70 and the document manager 60 shown in FIGS. 2-4.

The mechanisms and processes set forth in the present description may be implemented using a conventional general purpose microprocessor(s) programmed according to the teachings of the present specification, as will be appreciated to those skilled in the relevant arts. Appropriate software coding can readily be prepared by skilled programmers based on the teachings of the present disclosure, as will also be apparent to those skilled in the relevant arts.

The present invention thus also includes a computer-based product that may be hosted on a storage medium and include instructions that can be used to program a computer to perform a process in accordance with the present invention. This storage medium can include, but is not limited to, any type of disk including floppy disks, optical disks, CD-ROM, magneto-optical disks, ROMs, RAMs, EPROMs, EEPROMs, Flash Memory, Magnetic or Optical Cards, or any type of media suitable for storing electronic instructions.

This invention may also be conveniently implemented using a conventional general purpose digital computer programmed according to the teachings of the present specification, as will be apparent to those skilled in the computer art. Appropriate software coding can readily be prepared by skilled programmers based on the teachings of the present disclosure as will be apparent to those skilled in the software art. In particular, the computer program product for managing ASP documents according to the present invention can be written in a number of computer languages including but not limited to C, $C^{++}$, Fortran, and Basic, as would be recognized by those of ordinary skill in the art. The invention may also be implemented by the preparation of applications specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims the present invention may be practiced otherwise than as specifically described herein.

What is claimed as new and desired to be secured by Letters Patent of the United States is:

1. A method for managing documents, comprising the steps of:
   receiving a request from a user;
   selecting an application service provider from a plurality of application service providers based on said request;
   forwarding said request to said application service provider together with a user access level corresponding to said user, wherein said user access level includes at least first, second and third sections, each section indicating a different hierarchical level of access;

receiving information from said application service provider indicating information of a document provided from said application service provider to said user based on a comparison between an access level of said document and each of said different hierarchical levels of access indicated by said at least first, second and third sections included in said user access level corresponding to said user; and formatting said document from said application service provider into a standardized format regardless of which application service provider of said plurality of application service providers is selected.

2. The method of claim 1, further comprising the step of providing said user with said document from said application service provider.

3. The method of claim 2, wherein the step of providing said document to said user comprises:
delivering a print out of said document to said user; and
providing said user with a URL of said document.

4. The method of claim 2, wherein the step of providing said document to said user comprises transmitting said document to a user storage device.

5. The method of claim 2, wherein the step of providing said document to said user comprises transmitting said document to a user display device.

6. The method of claim 1, further comprising the step of searching for said document in said application service provider.

7. The method of claim 1, further comprising the steps of:
retrieving said document;
formatting said document into a format requested by said user; and
providing said user with said document formatted in said formatting step.

8. The method of claim 1, further comprising the steps of:
generating a unified bill from bills received from application service providers; and
transmitting said unified bill to said user.

9. The method of claim 1, wherein the receiving information step comprises receiving the information which is a billing information.

10. The method of claim 1, wherein the receiving information step comprises receiving the information which is the document.

11. The method of claim 1, wherein the receiving information step comprises receiving the information which is a URL for said document.

12. A system for managing documents, comprising:
a request receiving device configured to receive a request from a user;
a selecting device configured to select an application service provider from a plurality of application service providers based on said request;
a forwarding device configured to forward said request to said application service provider together with a user access level corresponding to said user, wherein said user access level includes at least first, second and third sections, each section indicating a different hierarchical level of access;
an information receiving device configured to receive information from said application service provider indicating information of a document provided from said application service provider to said user based on a comparison between an access level of said document and each of said different hierarchical levels of access indicated by said at least first, second and third sections included in said user access level corresponding to said user; and a formatting device configured to format said document from said application service provider into a standardized format regardless of which application service provider of said plurality of application service providers is selected.

13. The system of claim 12, further comprising a providing device configured to provide said user with said document from said application service provider.

14. The system of claim 13, wherein said providing device comprises:
a delivering device configured to deliver a print out of said document to said user; and
a device configured to provide said user with a URL of said document.

15. The system of claim 13, wherein said providing device comprises a transmitting device configured to transmit said document to a user storage device.

16. The system of claim 13, wherein said providing device comprises a transmitting device configured to transmit said document to a user display device.

17. The system of claim 12, further comprising a searching device configured to search for said document in said application service provider.

18. The system of claim 12, further comprising:
a retrieving device configured to retrieve said document;
a requested formatting device configured to format said document into a format requested by said user; and
a providing device configured to provide said user with said document formatted by said requested formatting device.

19. The system of claim 12, further comprising:
a bill generating device configured to generate a unified bill from bills received from application service providers; and
a transmitting device configured to transmit said unified bill to said user.

20. The system of claim 12, wherein said information receiving device comprises a billing information receiving device configured to receive a billing information.

21. The system of claim 12, wherein said information receiving device comprises a document receiving device configured to receive the document.

22. The system of claim 12, wherein said information receiving device comprises a device configured to receive a URL for said document.

23. A computer program product, comprising:
a non-transitory computer storage medium and a computer program code mechanism embedded in the computer storage medium for causing a computer to manage documents over a computer network, the computer program code mechanism comprising:
a first computer code device configured to receive a request from a user;
a second computer code device configured to select an application service provider from a plurality of application service providers based on said request;
a third computer code device configured to forward said request to said application service provider together with a user access level corresponding to said user, wherein said user access level includes at least first, second and third sections, each section indicating a different hierarchical level of access;
a fourth computer code device configured to receive information from said application service provider indicating information of a document provided from said application service provider to said user based on a comparison between an access level of said document and each of said different hierarchical levels of access indicated by said at least first, second and third sections included in said user access level corresponding to said user; and a fifth computer code configured to format said document from said application service provider into a standardized format regardless of which application service provider of said plurality of application service providers is selected.

24. The computer program product of claim 23, further comprising a sixth computer code device configured to provide said user with said document from said application service provider.

25. The computer program product of claim 24, wherein the sixth computer code device comprises:
   a seventh computer code device configured to deliver a print out of said document to said user; and
   an eighth computer code device configured to provide said user with a URL of said document.

26. The computer program product of claim 24, wherein the sixth computer code device comprises a seventh computer code device configured to transmit said document to a user storage device.

27. The computer program product of claim 24, wherein the sixth computer code device comprises a seventh computer code device configured to transmit said document to a user display device.

28. The computer program product of claim 23, further comprising a sixth computer code device configured to search for said document in said application service provider.

29. The computer program product of claim 23, further comprising:
   a sixth computer code device configured to retrieve said document;
   a seventh computer code device configured to format said document into a format requested by said user; and
   an eighth computer code device configured to provide said user with said document formatted in said formatting step.

30. The computer program product of claim 23, further comprising:
   a sixth computer code device configured to generate a unified bill from bills received from application service providers; and
   a seventh computer code device configured to transmit said unified bill to said user.

31. The computer program product of claim 23, wherein the fourth computer code device is configured to receive a billing information.

32. The computer program product of claim 23, wherein the fourth computer code device is configured to receive the document.

33. The computer program product of claim 23, wherein the fourth computer code device is configured to receive a URL for said document.

34. A method for managing documents, comprising the steps of:
   receiving a request from a user;
   receiving a document and storage information from said user;
   selecting an application service provider from a plurality of application service providers based on said storage information;
   transmitting said document and at least part of said storage information to a storage device of said application service provider together with a user access level corresponding to said document, wherein said user access level includes at least first, second and third sections, each section indicating a different hierarchical level of access, and access to said document is based on a comparison between a user access level and each of said different hierarchical levels of access indicated by said at least first, second and third sections included in said document access level corresponding to said document; and
   formatting said document from said application service provider into a standardized format regardless of which application service provider of said plurality of application service providers is selected.

35. The method of claim 34, wherein the step of receiving said document and storage information is performed after a storage time period associated with said document.

36. The method of claim 34, wherein the step of selecting said application service provider is performed based on a document type for said document.

37. The method of claim 34, further comprising the steps of:
   generating a unified bill from bills received from application service providers; and
   transmitting said unified bill to said user.

38. A system for managing documents, comprising
   a request receiving device configured to receive a request from a user;
   a receiving device configured to receive a document and storage information from said user;
   a selecting device configured to select an application service provider from a plurality of application service providers based on said storage information;
   a transmitting device configured to transmit said document and at least part of said storage information to a storage device of said application service provider together with a user access level corresponding to said document, wherein said user access level includes at least first, second and third sections, each section indicating a different hierarchical level of access, and access to said document is based on a comparison between a user access level and each of said different hierarchical levels of access indicated by said at least first, second and third sections included in said document access level corresponding to said document; and
   a formatting device configured to format said documents from said application service provider into a standardized format regardless of which application service provider of said plurality of application service providers is selected.

39. The system of claim 38, wherein said receiving device configured to receive said document and said storage information is configured to receive said document and said storage information after a storage time period associated with said document.

40. The system of claim 38, wherein said selecting device is configured to select based on a document type for said document.

41. The system of claim 38, further comprising:
   a bill generating device configured to generate a unified bill from bills received from application service providers; and
   a bill transmitting device configured to transmit said unified bill to said user.

42. A computer program product, comprising:
   a non-transitory computer storage medium and a computer program code mechanism embedded in the computer storage medium for causing a computer to manage documents over a computer network, the computer program code mechanism comprising:

a first computer code device configured to receive a request from a user;

a second computer code device configured to receive a document and storage information from said user;

a third computer code device configured to select an application service provider from a plurality of application service providers based on said storage information;

a fourth computer code device configured to transmit said document and at least part of said storage information to a storage device of said application service provider together with a user access level corresponding to said document, wherein said user access level includes at least first, second and third sections, each section indicating a different hierarchical level of access, and access to said document is based on a comparison between a user access level and each of said different hierarchical levels of access indicated by said at least first, second and third sections included in said document access level corresponding to said document; and a fifth computer code configured to format said document from said application service provider into a standardized format regardless of which application service provider of said plurality of application service providers is selected.

43. The computer program product of claim 42, wherein the second computer code device is configured to receive said document and storage information after a storage time period associated with said document.

44. The computer program product of claim 42, wherein the third computer code device is configured to select said application service provider based on a document type for said document.

45. The computer program product of claim 42, further comprising:

a sixth computer code device configured to generate a unified bill from bills received from application service providers; and a seventh computer code device configured to transmit said unified bill to said user.

* * * * *